United States Patent [19]
Mozer

[11] Patent Number: 5,229,141
[45] Date of Patent: Jul. 20, 1993

[54] CARBON FIBER FACSIMILE PROCESS

[76] Inventor: Rudolph W. Mozer, 3270 Kernway Ct., Bloomfield Hills, Mich. 48304

[21] Appl. No.: 632,014

[22] Filed: Dec. 21, 1990

[51] Int. Cl.$^5$ .............................................. B29C 17/01
[52] U.S. Cl. ...................................... 264/257; 264/258; 264/511
[58] Field of Search ............... 264/313, 257, 258, 510, 264/511, 512, 219, 73, 132, 546, 134; 425/388, 403; 156/272

[56] References Cited

U.S. PATENT DOCUMENTS

| | | | |
|---|---|---|---|
| 3,140,325 | 7/1964 | Graff | 264/93 |
| 3,242,247 | 3/1966 | Watson | 264/219 |
| 3,642,975 | 2/1972 | Duggins et al. | 264/73 |
| 4,069,000 | 1/1978 | Hampshire | 425/395 |
| 4,252,592 | 2/1981 | Green | 156/272 |
| 4,509,358 | 4/1985 | Krowl | 264/219 |
| 4,944,908 | 7/1990 | Leveque et al. | 264/132 |
| 4,946,640 | 8/1990 | Nathoo | 264/546 |
| 4,952,358 | 8/1990 | Okina et al. | 264/134 |
| 4,983,341 | 1/1991 | Kromrey | 425/388 |
| 5,071,338 | 12/1991 | Dublinski et al. | 425/403 |

Primary Examiner—Tim Heitbrink
Attorney, Agent, or Firm—John P. O'Banion

[57] ABSTRACT

A process for producing a carbon fiber facsimile (20) from a master model (16), wherein layers of epoxy impregnated carbon fiber weave (52) are applied to the surface of master model (16), a pressure pad (26) having a first surface with topography substantially complementing the surface topography of master model (16) and a second side adapted for substantially uniform transmittal of pressure is placed thereon, a breather cloth (56) is placed over the layers of epoxy impregnated carbon fiber weave (52), a rubber membrane (58) is placed over the breather cloth (56), and the layers of epoxy impregnated carbon fiber weave (52) are cured under pressure using a catalyst for exothermic heat, producing a carbon fiber facsimile (20) having a uniform wall thickness, a first side (60) having surface topography complementing the topography of surface (22) of master model (16) and a second side (62) having surface topography which is substantially parallel to the topography of surface (22) of master model (16). The cured carbon fiber facsimile (20) is then removed from master model (16) and used as a dimensionally accurate replica of a production stage component.

21 Claims, 5 Drawing Sheets

CARBON FIBER FACSIMILE PROCESS

BACKGROUND OF THE INVENTION

1. Field of the Invention

This invention pertains generally to producing facsimiles of physical objects, and more particularly to production of a facsimile with uniform wall thickness and surface topography which matches that of a production stage component.

In the automotive and other industries, models are commonly used prior to the development of production prototypes. In the development process for a new product, however, there is a need for dimensionally accurate facsimiles of proposed production stage components well in advance of the actual production stage.

2. Description of the Background Art

For several decades the automotive industry, as well as the aircraft and boat building industry, has used laminated composite shapes, skins or components constructed of glass fiber cloth bonded with either a polyester, epoxy or urethane matrix. These composites are widely used in boat hulls, racing cars, tooling aids, mockups, aircraft components, and the like.

As a result of the foregoing applications, advanced fibers and cloths made from carbon, graphite or aramid materials began to appear in the marketplace, where they found further use in highly-stressed, critical aircraft components, usually in the form of pre-pregnated cloths which were then cured under heat and pressure in autoclaves. Other early applications of these advanced fiber materials were partial or complete shells of racing cars, boats and airplanes.

Figure 8:
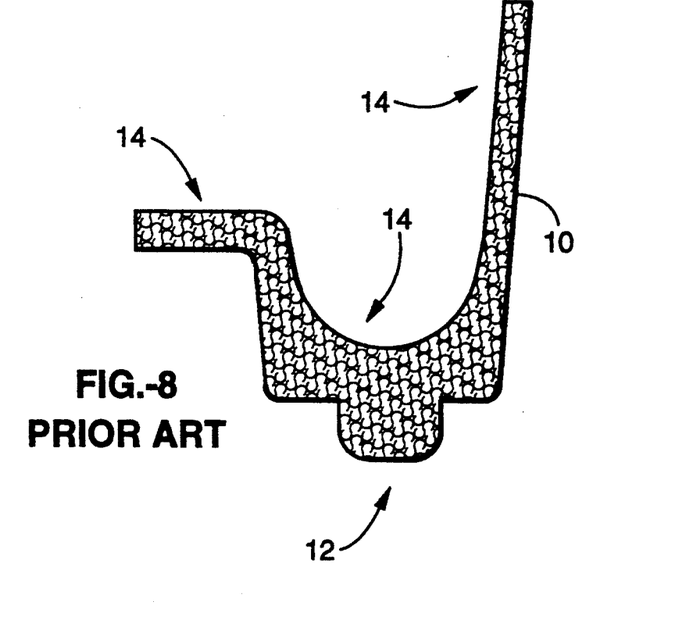
FIG. 8 is a cross-sectional view of an exemplary carbon fiber facsimile produced from the master model shown in FIG. 1 using conventional means.

It is well known that pre-production facsimiles for those types of applications can be produced from carbon fiber materials by making a master model, forming a single or multi-layer skin over the surface of the master model, impregnating the skin with epoxy, and curing the skin while heat and pressure is applied to the side of the skin which does not contact the master model. As shown in FIG. 8, however, conventional processing techniques produce facsimiles which are dimensionally accurate with respect to one surface only. Facsimile 10 represents a facsimile produced using conventional techniques. Lower surface 12 represents the front side of a facsimile 10 which was fabricated from a master model identical to master model 16 shown in FIG. 1. Surface 12 is the surface of facsimile 10 which was immediately adjacent to the surface 22 of master model 16 and, as can be seen, complements the surface topography of master model 16. Upper surface 14 represents the back side of facsimile 10 to which pressure was applied. Note that the topography of surface 14 does not conform to the shape of surface 12 and that facsimile 10 does not exhibit uniform wall thickness.

For certain applications, these conventional techniques are suitable. However, in critical applications such as those where it is necessary to develop prototypes which have dimensionally accurate external and internal surfaces, conventional techniques fail.

For example, in developing a prototype of an automobile, it is desirable to simulate the complete outer body assembly as well as a complete inner chassis assembly and to coordinate the fitting of parts. This requires dimensionally accurate facsimiles of the actual sheet metal parts that will be used in the production stage. Because conventional techniques are suitable for making facsimiles of only one surface of a model, considerable time is required to shape and fit the facsimiles of the inner chassis components. Conventional techniques are not capable of producing dimensionally accurate facsimiles of components which duplicate the shape of both surfaces, as well as the wall thickness, of the final component.

The reason that conventional techniques for making facsimiles from these materials fail can be seen by referring again to FIG. 1. In areas of a female radius or "fillet" 18 of a master model 16, when a laminate skin is compressed into fillet 18, instead of producing a facsimile which has a uniform wall thickness as desired to duplicate the production component, the area around fillet 18 will be sometimes double the desired metal thickness or more. Conventional facsimile techniques do not employ means to shape and conform the back side of the laminate skin to the surface topography of the master model before pressure is applied. Due to these resultant non-conformities and irregularities, especially in the fillet areas, these parts do not have uniform wall thickness and lack suitable precision to make dimensionally accurate simulations of automotive assemblies.

SUMMARY OF THE INVENTION

The present invention pertains to a process for producing a dimensionally accurate carbon fiber facsimile of a production stage component, typically a sheet metal or plastic component. The carbon fiber facsimile produced by the present invention is a dimensionally accurate reproduction of that component and will have uniform wall thickness as well as a degree of rigidity equal to or greater than that of the actual production part. Facsimiles produced by the present invention are particularly useful for simulation of sheet metal and plastic parts used in the construction of automobile inner chassis and outer body assemblies.

By way of example and not of limitation, the process of the present invention generally begins with the preparation of a pressure pad which is used to provide backside definition to the facsimile produced. To prepare the pressure pad, a parting agent is applied to the surface area of a dimensionally approved master model to be duplicated. In the preferred embodiment, a surface coat of epoxy is then applied to the surface of the master model, several layers of fiberglass weave skin are laminated over the surface of the master model with coats of epoxy applied between the layers, a final coat of epoxy is applied to the upper surface of the layers of fiberglass weave skin, and the laminated material is cured. In an alternative embodiment, the pressure pad is molded from the recessed areas (fillets) of the master model after first applying a layer of sheet wax equal in thickness to the thickness of the facsimile to be produced. Using either alternative, the pressure pad is removed from the master model when the curing process is complete.

The front side of the pressure pad will have a surface topography which substantially complements the surface topography of the master model to be duplicated. When the sheet wax alternative is employed, the front side of the pressure pad complements the surface topography of the master model except to the extent that it was displaced from the actual surface of the master model by the layer of sheet wax, since the layer of sheet wax has the same thickness as the facsimile to be produced.

Once the pressure pad is cured, the back side of the pressure pad is then adapted by filling and rounding out any recesses that exist so as to leave only shallow gently curved areas of female radii, or fillets. This filling and rounding out of the recesses in the back side of the pressure pad is a critical step in the entire process because it permits pressure applied to the back side of the pressure pad to be uniformly transmitted to the front side of the pressure pad, and is a step required to overcome the failures of conventional facsimile techniques. All sharp and deep recesses in the back side of the pressure pad are eliminated in this manner. Additionally, where the pressure pad prepared by the earlier steps is a continuous hardened fiberglass skin, the skin is cut into separate members or, alternatively, holes or slots are cut in the skin for excess epoxy to flow through. Where the pressure pad was formed from only the fillet areas of the master model, sheets of wax or laminate strips are used as pad members to cover the remaining surface areas of the master model.

After preparation of the pressure pad is complete, the master model is cleaned and coated with a parting agent. A coating of epoxy is then brushed on over the parting agent, and sheets of woven material made from carbon fiber, fiberglass, KEVLAR, or a combination of thereof, are placed over the epoxy, using a sufficient number of layers to achieve the desired wall thickness of the facsimile to be fabricated. Preferably the woven material is made from carbon fiber. The sheets of carbon fiber material are laminated by coating them with epoxy. Other thermosetting resins such as polyester could be used, but epoxy is recommended for providing the best stability.

The pressure pad is then coated with a parting agent and placed over the epoxy impregnated carbon fiber material, the pad members being separated or slotted so as to leave gaps through which excess epoxy can flow.

Next, a breather cloth which will absorb excess epoxy is placed over the pressure pad. Then a deformable rubber or plastic membrane is placed over the breather cloth. Pressure is then applied over the entire surface of the deformable membrane and the material is cured. Preferably a vacuum (subatmospheric pressure) is drawn under the rubber membrane to generate atmospheric pressure on the outer surface of the rubber membrane, but the pressure can also be positive atmospheric pressure applied with an autoclave or physically applied with a clamping means.

After curing is complete, the deformable membrane, breather cloth and pressure pad are stripped off, the carbon fiber facsimile is removed from the master model, and the edges are trimmed as necessary.

Significantly, the backside definition which results from use of a pressure pad produces a facsimile which has a uniform wall thickness. As a result of filling in and rounding out the recesses in the back side of the pressure pad, when pressure is applied the deformable membrane stretches into and presses against the entire back surface of the pressure pad. This causes uniform application of pressure to the back surface of the pressure pad. Because the front side of the pressure pad had a surface topography substantially complementing the surface topography of the master model, the back side of the facsimile will have parallel definition. The resultant product is a dimensionally accurate carbon fiber facsimile of the production component.

Industry applications for the process are widespread, particularly in the automotive industry. Automotive inner and outer chassis applications include proof out of manual and computer aided design details, coordination of assemblies before fabrication of prototype and production tools, matching of connecting and/or mounting flanges, elimination of design interference, center of gravity determinations of assemblies, torsional rigidity studies, packaging studies of assemblies, early coordination of welding machines and fixtures, assistance and coordination of robotics and transfer machines, and correlation aids for checking fixtures. Automotive interior applications include proof out of manual and computer aided design details, complete interior environmental quality fixtures (macrobucs), correlation aids for process gauges, pre-prototype assemblies, and interiors for clinic cars.

An object of the invention is to produce facsimiles which duplicate surface topography and wall thickness to within 0.2 millimeters, which is the standard tolerance for models.

Another object of the invention is to produce facsimiles which are dimensionally accurate both front and back.

Another object of the invention is to produce facsimiles which have uniform wall thickness.

Another object of the invention is to produce facsimiles which identically duplicate production components.

Another object of the invention is to produce facsimiles with rigidity equal to or greater than that of the actual production part under ambient temperatures prevailing during tooling and assembly.

Another object of the invention is to achieve repeatability in properties such as rigidity and specific weight.

Another object of the invention is to produce facsimiles from which factored correlations in dimension and strength can be made to final production parts and assemblies.

Another object of the invention is to reduce the time and cost associated with coordination and adjustment of components in prototype structures.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

For illustrative purposes the present invention can be understood with reference to specification herein and the drawings of FIG. 1 through FIG. 7. It will be appreciated that the process may vary as to configuration and as to details of the steps without departing from the basic concepts as disclosed herein.

Figure 1:
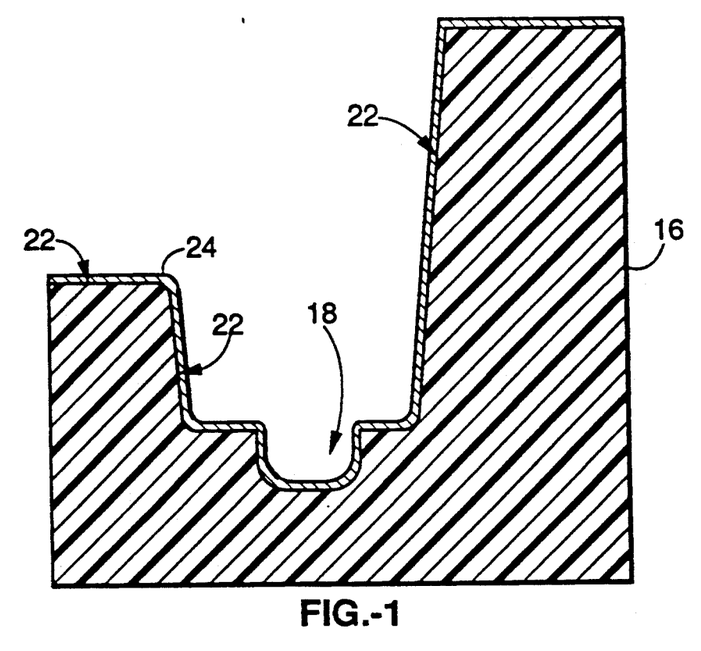
FIG. 1 is a cross-sectional view of a master model used in the process of the present invention.
Figure 7:
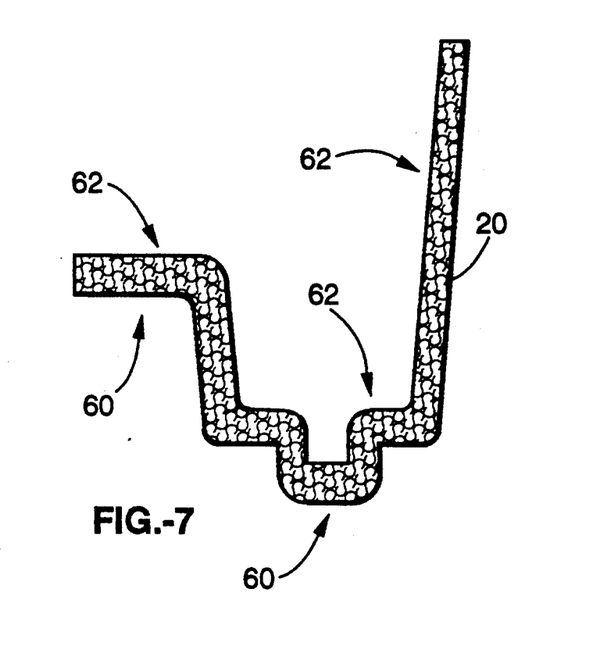
FIG. 7 is a cross-sectional view of an exemplary carbon fiber facsimile produced from the master model shown in FIG. 1 using the process of the present invention.

Referring to FIG. 1, the process begins with the preparation of a dimensionally accurate master model 16 from which facsimile 20 shown in FIG. 7 will be produced. Master model 16 will have a surface topography 22 which is complementary to one surface of the facsimile to be produced. Master model 16 is called a "negative master" since the facsimile produced fits within master model 16. If a mirror image of master model 16 was used instead, then the master model would be a "positive master." The selection of a positive or negative master model depends primarily on the shape of the facsimile to be produced and whether the surface topography of the master model is to represent the inside or outside of the production stage component.

Master model 16 can be fashioned satisfactorily from a number of materials. Examples are solid wood, laminated wood, epoxy or urethane model plank such as CibaGeigy Corporation "Oreol", epoxy/fiberglass laminations, epoxy/carbon laminations, plaster casts, solid metal, spray metal, fiberglass reinforced or unreinforced cardboard models, or high density urethane, styrene, or acryl foam. Because the process of the present invention requires application of pressure to master model 16, the material from which master model 16 must be constructed to retain the required dimensional accuracy and not fatigue under pressure. The best suited material is model plank which is in common use in the industry.

Because the process of the present invention uses thermosetting resins which will adhere to surface 22 of master model 16, to prevent adhesion of these thermosetting resins it is desirable to apply a parting agent 24 to surface 22 of master model 16, as well as to the surface of any reusable component which will be in contact with thermosetting resin. Examples of acceptable compounds for parting agent 24 are polyvinyl alcohol or silicone in combination with wax. To apply parting agent 24, the wax is spread over the surface to be prepared and then the waxed surface is buffed. A film of polyvinyl alcohol or silicone is then sprayed over the wax and allowed to dry. The parting agent will then prevent adhesion of the thermosetting resins to the treated surface. Alternatively, the components used in the present invention could be made of materials which do not adhere to the thermosetting resin.

Figure 2:
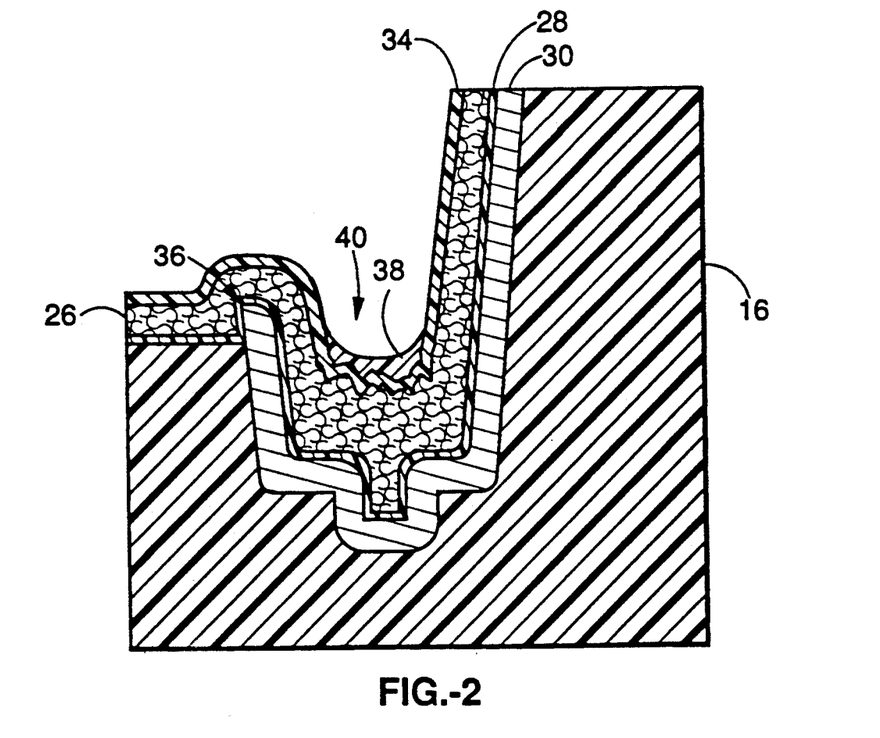
FIG. 2 is a cross-sectional view of the lay-up resulting from the steps employed to prepare a pressure pad from the master model shown in FIG. 1.
Figure 3:
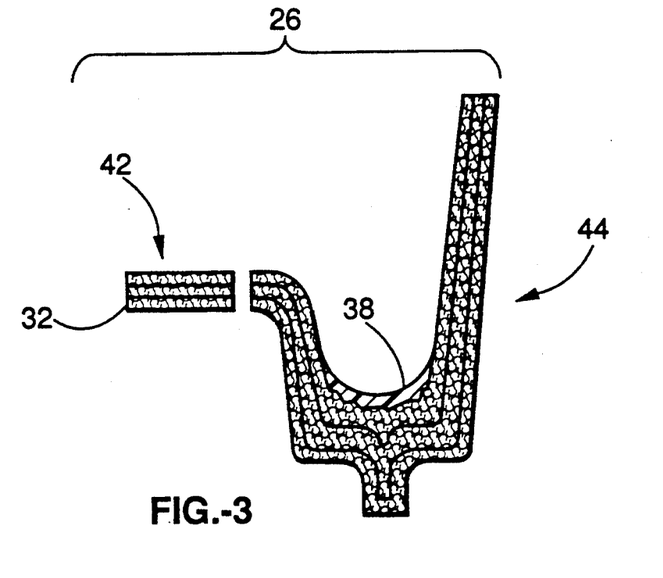
FIG. 3 is a cross-sectional view of the pressure pad of FIG. 2 showing multiple layers of woven pressure pad material.

Referring now to FIG. 1, FIG. 2, and FIG. 3 together, the next step is to prepare pressure pad 26. In many applications, pressure pad 26 can be formed directly from surface 22 of master model 16 as a continuous skin. In other applications, preparation of pressure pad 26 requires intermediate steps in the process.

For a complicated surface topography, such as shown in master model 16, forming pressure pad 26 directly from surface 22 of master model 16 would produce a pressure pad which would not fit into place after the material from which the facsimile will be fabricated is later applied to master model 16. This problem occurs when vertical or near vertical walls are adjacent to recessed areas such as those adjacent to fillet 18.

Therefore, for preparing pressure pad 26 from a complicated topography as shown, the first step is to place a layer of sheet wax 30 over the recessed portions of surface 22 of master model 16 as shown. The thickness of sheet wax 30 should be the same as that of the facsimile to be produced in order to produce a proper fit. An example of suitable sheet wax is Master Brand available from Kondt-Collins Co.

A coat of parting agent 24 is then applied to the surface of the sheet wax 30 and the remaining portions of surface 22 not covered by sheet wax 30 to prevent adhesion of thermosetting resin to those surfaces. A surface coat of thermosetting resin 28 is then applied over the coat of parting agent.

Layers of woven fiberglass or carbon fiber pad material 32, or the like, are then laminated over the surface coat of thermosetting resin to form pressure pad 26. Woven material is used so that the thermosetting resin will penetrate the material between the weaves and form a matrix. Typically three to four layers of 0.3 millimeter thick woven fiberglass material or the like, with coats of thermosetting resin applied between the layers, are used to form the continuous laminated skin that will become pressure pad 26. A final coat of thermosetting resin 34 is then applied over the top layer of woven material, and the layers of laminated woven material are pressed into place over the surface of the master model. The thermosetting resin is then cured and the pressure pad is removed from the master model.

Note that a discontinuity in pressure pad 26 is created at break point 36 because sheet wax 30 was not applied over a portion of surface 22. Despite this discontinuity, pressure pad 26 is still formed in a continuous piece by bending the layers of woven pad material 32 downward around break point 36.

When a pressure pad is to be formed directly from the surface of a master model, the use of sheet wax 30 can be omitted. A layer of parting agent is applied to the entire surface of the master model before applying a surface coat of thermosetting resin, and the layers of woven fiberglass or carbon fiber material are laminated in place as generally described above. These steps are generally suitable for preparation of a pressure pad where the surface topography of the master model does not contain vertical or near vertical walls adjacent to recessed areas.

Alternatively, a pressure pad could be formed by molding the woven fiberglass or carbon fiber material only into recessed areas such as fillet 18 and immediately adjacent areas, and using sheet wax as the remaining portions of the pressure pad.

Because pressure pad 26 is formed from master model 16 in this manner, the lower or front surface of pressure pad 26 will have a topography which is substantially complementary to the topography of surface 22, except to the extent that it was displaced from surface 22 by sheet wax 30. Where the use of sheet wax 30 is not required, the front surface of pressure pad 26 will be an identical reverse image of surface 22 of master model 16. It is critical in the process that the topography of one surface of pressure pad 26 substantially complement the topography of surface 22 of master model 16.

The next step is to adapt the upper or back surface of pressure pad 26 so that pressure applied to the back surface will be uniformly distributed to its lower or front surface. This is done by filling in and rounding any depressions 38 on the back surface of pressure pad 26 with epoxy or the like so as to create a relatively shallow fillet 40 with gentle curves as shown. Pressure pad 26 is then removed from master model 16 and separated into pad members 42, 44 by making a vertical cut or otherwise detaching pad members 42, 44 at or near break point 36. Separation of these pad members is unnecessary when the pressure pad is formed directly from the surface of the master model. Pressure pad 26 is now ready to use.

Figure 4:
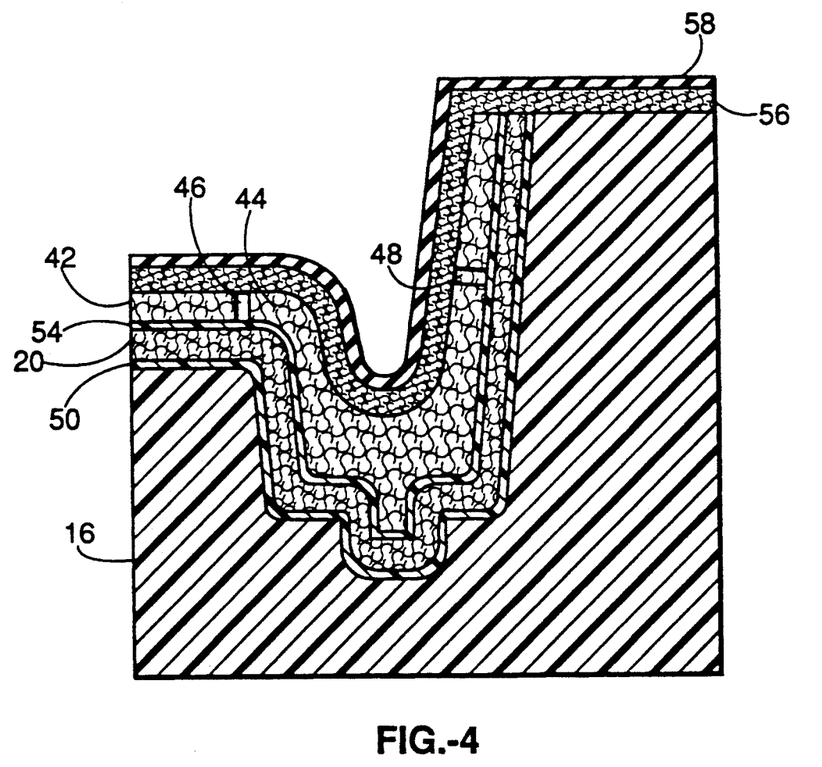
FIG. 4 is a cross-sectional view of the lay-up resulting from the steps employed to prepare a carbon fiber facsimile using the master model shown in FIG. 1 and the pressure pad shown in FIG. 3.
Figure 5:
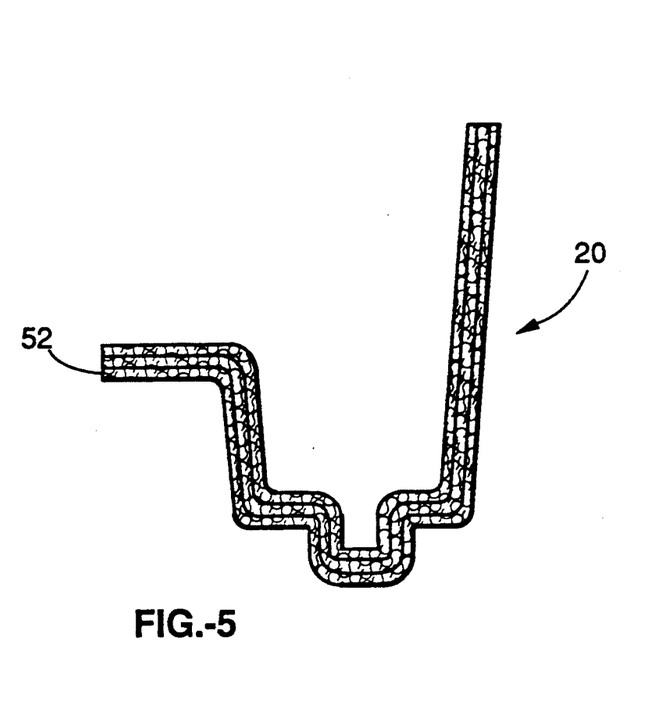
FIG. 5 is a cross-sectional view of the carbon fiber facsimile of FIG. 4 showing multiple layers of woven facsimile material.

Referring now to FIG. 1, FIG. 4, and FIG. 5, surface 22 of master model 16 is then cleaned and a coat of parting agent 24 applied to surface 22 as before to prevent adhesion of thermosetting resin. Next, a surface coat of thermosetting resin 50 applied over the coat of parting agent.

Layers of woven facsimile material 52 are then laminated over the surface coat of thermosetting resin with coats of thermosetting resin applied between the layers, to form the continuous laminated skin that will become facsimile 20. Woven material is used so that the thermosetting resin will penetrate the material between the weaves and form a matrix.

The woven facsimile material 52 can be sheets of glass fiber, carbon fiber, aramid fiber KEVLAR aramid fiber available from DuPont, and the like, or any combination of those materials. The weave can be unidirectional or bidirectional, but must be open so as to permit the thermosetting resin to form a matrix. The number of layers of woven facsimile material 52 used is determined by the wall thickness of the facsimile to be produced, the wall thickness being the same as the production stage component. Suitable facsimile material employing graphite or carbon fibers is available from numerous commercial sources, such as Hercules, Morganite, Stackpole, Union Carbide, and others. Textile Technology produces a particularly suitable graphite cloth with an open weave under the designation Yarn 3K #G104. Essentially any advanced exotic, synthetic or natural fiber suitable for impregnation and bonding by a thermosetting single or multicomponent matrix could be used for facsimile material 52.

After facsimile material 52 is in place, a final coat of thermosetting resin 54 is applied over the top layer of facsimile material 52. The surfaces of pressure pad 26 are then coated with the same parting agent as was applied to surface 22 of master model 16. Pressure pad 26 is then pressed into place over facsimile material 52 leaving gap 46 between pad members 42, 44. Gap 46 is important so that excess thermosetting resin can escape through the opening created thereby when pressure is applied. Note that pressure pad 26 can alternatively be cut into strips, or holes or slots 48 can be cut into pressure pad 26 at other locations so that excess thermosetting resin can escape if necessary. Note also that, instead of using pad member 42, a strip of sheet wax could be used in its place. As described earlier, sheet wax is also a suitable pressure pad material, particularly in relatively horizontal areas.

Next, breather cloth 56 which is a conventional cloth material or Teflon-coated glass cloth capable of absorbing excess thermosetting resin is placed over pressure pad 26. Deformable rubber membrane 58 is then placed over breather cloth 56. The deformation characteristics of rubber membrane 56 are not critical so long as it stretches easily and will not rupture under pressure or vacuum. Deformable plastic could also be used instead of rubber.

Once all of the layers are in place, the nested assembly is subjected to pressure and the resin impregnated facsimile material 52 is cured to form facsimile 20. During the curing process, thermosetting resin penetrates the weave in facsimile material 52 and, in some cases, hardens. In the preferred embodiment, subatmospheric pressure (e.g., vacuum at approximately thirty inches mercury) is applied beneath rubber membrane 58 to create the equivalent of a vacuum chamber or vacuum bag in function. This results in atmospheric pressure being applied to the outer surface of rubber membrane 58 and, as a result of the lay up, also to the back side of pressure pad 26. Clamping pressure or positive atmospheric pressure can also be satisfactorily used.

With regard to clamping pressure, such pressure could be applied by any conventional clamping means and is particularly desirable for use in connection with molds prepared to produce three-dimensionally less parts. When producing such parts, an alternative to using a pressure pad would be to prepare a conventional mold having top, bottom and side cavities. Facsimiles can be produced using the same laminates as described herein, and pressure could be applied by clamping together the cavities of the mold.

The thermosetting resin used to laminate facsimile material 52, as well as to laminate pad material 32, can be from the family of liquid polymers and liquified polymers, and includes epoxy, urethane, and polyester. A typical thermosetting epoxy resin is WB 400 available from Resin Services and can be used with the WH 150 hardener (catalyst) available from the same source. Another suitable epoxy is available from CibaGeigy Corporation as MY-720. Other thermosetting matrices such as METTON available from Hercules Chemical Co., MODAR available from ICI Chemicals, or any other matrix from the family of liquid polymers and liquified polymers capable of penetrating, or whetting, facsimile material 52, and which will subsequently cure to a hardened or semi-hardened state, would also be suitable.

To assist in curing, heat as well as positive atmospheric pressure can be applied by means of an autoclave. However, in the preferred embodiment, external heat is not required because the thermosetting resin is used with a catalyst for generation of exothermic heat by the chemical reaction which results. Curing time can be one to twelve hours depending upon the particular thermosetting resin used.

Facsimile material 52 can also be a pre-preg material but will require the application of external heat. The term "pre-preg" is a term of art denoting preimpregnated unidirectional or bidirectional continuous filament fiber materials that may be temperature cured to provide a rigid composite material. A typical prepreg which can be used is Hercules Incorporated's magnamite prepreg-type 3501-AS. This is a graphite fiber epoxy and employs a thermosetting resin matrix that cures at approximately 350 degrees for a period of 30 minutes.

Figure 6:
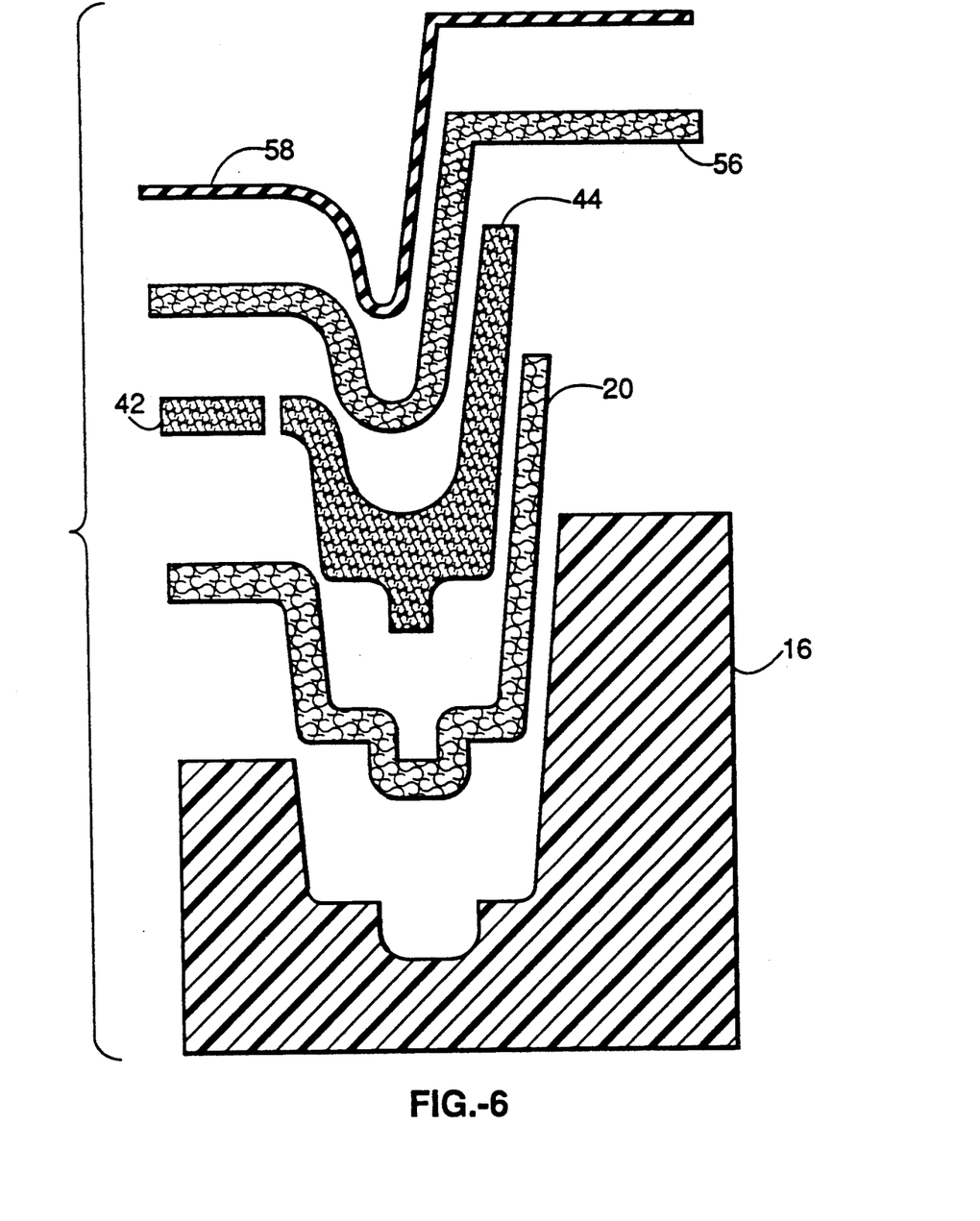
FIG. 6 is an exploded view of FIG. 4.

Referring now also to FIG. 6 and FIG. 7, once the facsimile material 52 is cured, the assembly is stripped apart and facsimile 20 is removed. Facsimile 20 has two surfaces, a lower or front surface 60 which has a topography which complements the topography of surface 22 of master model 16, and an upper or back surface 62 which has a topography which is substantially parallel to the topography of surface 22 of master model 16. This front and back definition is achievable only by the use of pressure pad 26, and the manner in which the back side of pressure pad 26 is adapted so that pressure applied to the back side will be uniformly transmitted to the front side of pressure pad 26. Referring again to FIG. 2, fillet 40 in the back side of pressure pad 26 is the basis of uniform pressure transmittal. When pressure is applied, rubber membrane 58 pushes against pressure pad 26 and stretches into its recesses, including fillet 40. By adapting the back side of pressure pad 26 to have shallow, rounded fillets, rubber membrane 58 can stretch into all of the recesses with pressure being applied uniformly. This would not be the case if the recesses were deep and narrow. Facsimile 20 will also be seen to have uniform wall thickness.

Accordingly, it will be seen that this invention can be used to produce carbon fiber facsimiles of heretofore unknown dimensional accuracies and rigidity. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A process for producing facsimiles of physical objects, comprising the steps of:
   (a) forming a pressure pad on a master model, said master model having surface topography to be duplicated, said pressure pad having a first side and a second side, said first side having surface topography substantially complementing said surface topography of said master model, said second side having surface topography for substantially uniform transmittal of pressure from said second side to said first side;
   (b) placing a fibrous material over said master model;
   (c) impregnating said fibrous material with a thermosetting resin;
   (d) placing said first side of said pressure pad over said fibrous material;
   (e) applying pressure to said second side of said pressure pad;
   (f) curing said resin impregnated fibrous material; and
   (g) removing said cured resin impregnated fibrous material from said master model, said cured resin impregnated fibrous material having a substantially uniform wall thickness.

2. The process recited in claim 1, wherein said fibrous material is selected from the group consisting of woven carbon fibers, woven aramid fibers, and woven glass fibers.

3. The process recited in claim 1, wherein said thermosetting resin is selected from the group consisting of liquid polymers and liquified polymers.

4. The process recited in claim 1, wherein the step of placing a fibrous material over said master model is preceded by the step of applying a parting agent to said master model.

5. The process recited in claim 1, wherein the step of placing said first side of said pressure pad over said fibrous material is preceded by the step of applying a parting agent to said first side of said pressure pad.

6. The process recited in claim 1, wherein the step of applying pressure to said second side of said pressure pad includes applying atmospheric pressure.

7. The process recited in claim 1, wherein the step of applying pressure to said second side of said pressure pad includes applying clamping pressure.

8. The process recited in claim 1, wherein the step of placing said first side of said pressure pad over said fibrous material is followed by the steps of:
   (a) placing a breather cloth over said second side of said pressure pad; and
   (b) placing a rubber membrane over said breather cloth.

9. The process recited in claim 8, further comprising the step of absorbing within said breather cloth excess thermosetting resin expressed from said fibrous material when said pressure is applied.

10. The process recited in claim 1, wherein said pressure pad comprises a plurality of pad members.

11. The process recited in claim 1, wherein said pressure pad comprises a hardened resin impregnated fibrous skin.

12. A process for producing carbon fiber facsimiles of sheet metal components, comprising the steps of:
    (a) forming a pressure pad on a master model, said master model having surface topography to be duplicated, said pressure pad having first and second sides, said first side having surface topography substantially complementing the surface topography of said master model, said step of forming a pressure pad including the steps of placing a fibrous material over said master model, impregnating said fibrous material with a thermosetting resin, applying pressure to said fibrous material, curing said impregnated fibrous material, removing said cured fibrous material from said master model, and filling and rounding any recesses in said second side of said pressure pad such that said second side is configured and structured for substantially uniform transmittal of pressure from said second side to said first side;
    (b) applying a parting agent to said master model;
    (c) placing plural layers of carbon fiber based woven material over said master model;
    (d) impregnating said carbon fiber based woven material with a thermosetting resin;
    (e) placing said first side of said pressure pad over said carbon fiber based woven material, said pressure pad having a parting agent applied to said first side, said first side opposing said master model;
    (f) applying pressure to said second side of said pressure pad;
    (g) curing said resin impregnated carbon fiber based woven material; and
    (h) removing said cured resin impregnated carbon fiber based woven material from said master model, said cured resin impregnated carbon fiber based woven material having a substantially uniform wall thickness.

13. The process recited in claim 12, wherein said thermosetting resin is selected from the group consisting of liquid polymers and liquified polymers.

14. The process recited in claim 12, wherein the step of applying pressure to said second side of said pressure pad includes applying atmospheric pressure.

15. The process recited in claim 12, wherein the step of applying pressure to said second side of said pressure pad includes applying clamping pressure.

16. The process recited in claim 12, wherein the step of placing said first side of said pressure pad over said carbon fiber based woven material is followed by the steps of:
 (a) placing a breather cloth over said second side of said pressure pad; and
 (b) placing a rubber membrane over said breather cloth.

17. The process recited in claim 16, further comprising the step of absorbing within said breather cloth excess thermosetting resin expressed from said carbon fiber based woven material when said pressure is applied.

18. The process recited in claim 12, wherein said pressure pad comprises a plurality of pad members.

19. The process recited in claim 12, wherein said pressure pad comprises a hardened resin impregnated fibrous skin.

20. A carbon fiber reproduction process, comprising the steps of:
 (a) applying a parting agent to the surface of a master model, said master model having a surface topography to be duplicated;
 (b) placing plural layers of carbon fiber weaves over said master model, the number of said plural layers determined by the desired thickness of the facsimile to be produced;
 (c) coating said plural layers of carbon fiber weaves with epoxy, whereby an epoxy matrix is formed;
 (d) placing a pressure pad over said plural layers of epoxy impregnated carbon fiber weaves, said pressure pad formed from said master model, said pressure pad having a first side and a second side, said first side having a surface topography substantially complementing the surface topography of said master model, said first side being coated with a parting agent, said first side opposing said master model, said second side having surface topography for substantially uniform transmission of pressure from said second side to said first side, said pressure pad having openings through which excess epoxy can flow;
 (e) placing a breather cloth over said pressure pad;
 (f) placing a rubber membrane over said breather cloth;
 (g) applying pressure to the nested assembly produced by steps (a) through (f);
 (h) curing said plural layers of epoxy impregnated carbon fiber weaves using an exothermic catalyst; and
 (i) removing said cured plural layers of epoxy impregnated carbon fiber weaves from the surface of said master model, said cured plural layers of epoxy impregnated carbon fiber weaves forming a component having substantially uniform wall thickness.

21. A process for producing carbon fiber facsimiles, comprising the steps of:
 (a) forming a pressure pad, said pressure pad having a first side and a second side, said first side having a surface topography substantially complementing the surface topography of a master model, said pressure pad formed from said master model;
 (b) preparing said second side of said pressure pad for substantially uniform transmission of pressure from said second side to said first side of said pressure pad by filling and rounding out any recesses that exist so as to leave only shallow gently curved fillets;
 (c) placing plural layers of carbon fiber weaves over the surface of said master model, the number of said plural layers determined by the desired wall thickness of the facsimile to be produced;
 (d) coating said plural layers of carbon fiber weaves with epoxy, whereby an epoxy matrix is formed;
 (e) placing said pressure pad over said plural layers of epoxy impregnated carbon fiber weaves;
 (f) applying pressure to the nested assembly produced by steps (a) through (e);
 (g) curing said plural layers of epoxy impregnated carbon fiber weaves using an exothermic catalyst; and
 (h) removing said cured plural layers of epoxy impregnated carbon fiber weaves from the surface of said master model.

* * * * *

UNITED STATES PATENT AND TRADEMARK OFFICE
CERTIFICATE OF CORRECTION

Page 1 of 3

PATENT NO. : 5,229,141
DATED : July 20, 1993
INVENTOR(S) : Rudolf W. Mozer

It is certified that error appears in the above-indentified patent and that said Letters Patent is hereby corrected as shown below:

Column 2, line 44, change "approved" to --accurate--.

Column 2, line 53, change "from the" to --in any--.

Column 2, line 53, change "areas" to --area--.

Column 2, line 53, delete "(fillets)".

Column 2, line 66, change "since" to --and--.

Column 2, line 67, change "has" to --would be sized to have--.

Column 2, line 67, before "facsimile" insert

--wall thickness of the--.

Column 5, line 10, after "to" insert --the--.

Column 5, line 23, after "instead" insert

--so that the facsimile produced fits over master model 16--.

Column 5, line 34, delete " or unrein-".

Column 5, line 35, delete "forced".

Column 5, line 46, change "desirable" to --necessary--.

UNITED STATES PATENT AND TRADEMARK OFFICE
CERTIFICATE OF CORRECTION

PATENT NO. : 5,229,141
DATED : July 20, 1993
INVENTOR(S) : Rudolf W. Mozer

It is certified that error appears in the above-indentified patent and that said Letters Patent is hereby corrected as shown below:

Column 5, line 57, change "components" to --models--.

Column 5, line 59, after "resin" insert --(e.g., RTV rubber)--.

Column 6, line 13, change "Kondt" to --Kindt--.

Column 7, line 17, after "24" insert --is--.

Column 7, line 18, delete "surface".

Column 7, line 19, after "50" insert --is--.

Column 7, line 29, before "KEVLAR", insert --,--.

Column 7, line 63, change "horizontal" to --flat--.

Column 8, line 9, delete ", in some cases,".

Column 8, line 16, delete ", as a result of the lay up,".

Column 8, line 22, after "less" insert --complex--.

UNITED STATES PATENT AND TRADEMARK OFFICE
CERTIFICATE OF CORRECTION

PATENT NO. : 5,229,141
DATED : July 20, 1993
INVENTOR(S) : Rudolf W. Mozer

It is certified that error appears in the above-indentified patent and that said Letters Patent is hereby corrected as shown below:

Column 8, line 25, after "and" insert --, in some cases,--.

Column 8, line 28, change "cavities" to --components--.

Column 8, line 51, change "twelve" to --twenty-four--.

Signed and Sealed this

Twenty-eighth Day of June, 1994

Attest:

BRUCE LEHMAN

Attesting Officer     Commissioner of Patents and Trademarks